(12) United States Patent
Fachat et al.

(10) Patent No.: US 9,188,014 B2
(45) Date of Patent: Nov. 17, 2015

(54) VIBRATION DAMPER COMPRISING A STRIP AND JACKETS BETWEEN OUTER PLATFORMS OF ADJACENT COMPOSITE-MATERIAL BLADES OF A TURBINE ENGINE ROTOR WHEEL

(75) Inventors: Thierry Fachat, Moret sur Loing (FR); Jean-Luc Soupizon, Vaux le Penil (FR); Patrick Joseph Marie Girard, Saint Fargeau Ponthierry (FR)

(73) Assignees: SNECMA, Paris (FR); HERAKLES, Le Haillan (FR)

( * ) Notice: Subject to any disclaimer, the term of this patent is extended or adjusted under 35 U.S.C. 154(b) by 710 days.

(21) Appl. No.: 13/574,926

(22) PCT Filed: Jan. 24, 2011

(86) PCT No.: PCT/FR2011/050124
§ 371 (c)(1),
(2), (4) Date: Nov. 14, 2012

(87) PCT Pub. No.: WO2011/092418
PCT Pub. Date: Aug. 4, 2011

(65) Prior Publication Data
US 2013/0052032 A1     Feb. 28, 2013

(30) Foreign Application Priority Data
Jan. 26, 2010   (FR) .................................... 10 50515

(51) Int. Cl.
*F01D 5/10* (2006.01)
*F01D 5/28* (2006.01)
*F01D 5/22* (2006.01)

(52) U.S. Cl.
CPC ................ *F01D 5/282* (2013.01); *F01D 5/225* (2013.01); *Y02T 50/672* (2013.01)

(58) Field of Classification Search
CPC .................................. F01D 5/225; F01D 5/282
See application file for complete search history.

(56) References Cited

U.S. PATENT DOCUMENTS

| | | | | |
|---|---|---|---|---|
| 1,544,318 A | * | 6/1925 | Hodgkinson | 416/193 R |
| 3,095,138 A | * | 6/1963 | Warnken | 416/190 |
| 3,377,050 A | * | 4/1968 | Guy | 416/191 |
| 3,556,675 A | * | 1/1971 | Howald et al. | 16/190 |
| 4,767,273 A | * | 8/1988 | Partington | 416/191 |
| 4,840,539 A | * | 6/1989 | Bourcier et al. | 416/191 |
| 5,645,402 A | * | 7/1997 | Cornelius et al. | 416/190 |

(Continued)

FOREIGN PATENT DOCUMENTS

| | | | |
|---|---|---|---|
| EP | 1 870 562 | | 12/2007 |
| GB | 2467582 A | * | 8/2010 |
| JP | 2000 204901 | | 7/2000 |

OTHER PUBLICATIONS

International Search Report Issued Mar. 30, 2011 in PCT/FR11/50124 Filed Jan. 24, 2011.

(Continued)

*Primary Examiner* — Igor Kershteyn
(74) *Attorney, Agent, or Firm* — Oblon, McClelland, Maier & Neustadt, L.L.P.

(57) ABSTRACT

A vibration damper between outer platforms of adjacent composite-material blades of a rotor wheel of a turbine engine, the damper including a strip for inserting lengthwise in tangential cavities that are formed facing each other in the outer platforms of two adjacent composite-material blades of a turbine engine rotor wheel.

8 Claims, 6 Drawing Sheets

(56) References Cited

U.S. PATENT DOCUMENTS

| | | | |
|---|---|---|---|
| 5,934,687 A * | 8/1999 | Bagepalli et al. | 277/637 |
| 6,371,727 B1 | 4/2002 | Stangeland et al. | |
| 2002/0122725 A1* | 9/2002 | Daam et al. | 416/190 |
| 2007/0297900 A1 | 12/2007 | Abgrall et al. | |

OTHER PUBLICATIONS

U.S. Appl. No. 13/521,587, filed Jul. 11, 2012, Blanchard, et al.

* cited by examiner

VIBRATION DAMPER COMPRISING A STRIP AND JACKETS BETWEEN OUTER PLATFORMS OF ADJACENT COMPOSITE-MATERIAL BLADES OF A TURBINE ENGINE ROTOR WHEEL

BACKGROUND OF THE INVENTION

The present invention relates to the general field of composite-material blades for a turbine engine rotor wheel. The invention relates more particularly to damping the vibration that appears in operation between the outer platforms of two adjacent blades of a rotor wheel.

A turbine engine rotor wheel, e.g. a rotor wheel of a low-pressure turbine stage of a turbojet, comprises a disk having a plurality of blades mounted thereon. At their free radial ends, each blade has a transverse element referred to as an outer platform, which serves in particular to define the outside of the flow passage for the gas stream passing through the turbine.

The outer platform of such a blade has an upstream edge and a downstream edge extending perpendicularly relative to the flow direction of the gas stream. These edges are connected together by two side edges via which the outer platform of the blade comes into contact with the outer platforms of the two blades of the rotor wheel that are directly adjacent thereto.

In general, with metal blades, the side edges have a so-called "Z-profile", i.e. each of them has two axial portions interconnected by a portion that is substantially transverse. In order to damp the vibration to which they are subjected while the turbine is in operation, it is known to mount the blades on the disk with a certain amount of twisting about their main axes. At the outer platform of any one particular blade, this twist stress serves to put the transverse portions of the outer platform of the blade into contact with the transverse portions of the outer platforms of the adjacent blades. The contact and friction forces as generated in this way at the outer platforms of the blades serve to dissipate the vibratory energy resulting from operation of the turbine.

Such vibration damping is nevertheless not applicable to rotor wheels in which the blades are made of composite material. In particular, for a ceramic matrix composite (CMC) blade, the stresses generated by twisting the blade are excessive compared with the capacity of the composite material. Furthermore, having recourse to blades that are made of composite material also has the drawback of giving rise to large offsets or to large displacements between the outer platforms of adjacent blades in the event of mutual tilting between the blades.

OBJECT AND SUMMARY OF THE INVENTION

A main object of the present invention is thus to mitigate such drawbacks by proposing to damp vibration between the outer platforms of adjacent composite-material blades in an effective manner without generating excessive stresses in the blades.

This object is achieved by a vibration damper between the outer platforms of adjacent composite-material blades of a rotor wheel of a turbine engine, the damper comprising a strip for inserting lengthwise in tangential cavities that are formed facing each other in the outer platforms of two adjacent composite-material blades of a turbine engine rotor wheel.

In operation, under the effect of the centrifugal force due to the wheel rotating, the strip becomes pressed against the walls of the cavities in the outer platforms and rubs against said walls. This rubbing serves to dissipate the vibratory energy associated with the rotation of the rotor wheel. No stress is applied to the blades in order to obtain such energy dissipation. This serves to increase the lifetime of the blades. The damper does not degrade the performance of the rotor wheel (the flow passage for the gas stream passing through the wheel is not modified by the presence of the damper).

In addition, such a damper is radially compact, such that the sealing wipers carried by the outer platform can be of small diameter. This makes it possible to reduce the diameter of the casing surrounding the rotor wheel, thereby leading to a saving of mass.

In a first embodiment, the vibration damper further includes two jackets, each in the form of a plate folded in half, the jackets being designed to be received in the cavities in the outer platforms of the blades and each of them being designed to receive one end of the strip.

In this embodiment, vibratory energy is dissipated by the strip rubbing against the jackets. The presence of such jackets makes it possible, in operation, to avoid the strips wearing away directly the outer platforms of the blades between which they are mounted.

In a second embodiment, the free ends of the strip are folded to form hooks that pass through openings formed in outer walls of the cavities in the outer platforms of the blades.

In this embodiment, the presence of hooks serves to limit the displacements between the outer platforms of the blades in the event of the blades tilting mutually.

In a third embodiment, the strip is provided with a plate extending transversely relative to the strip and designed to come into contact with the adjacent side edges of the blades when the strip is inserted in the cavities in said outer platforms.

In this embodiment, the presence of a plate that is interposed circumferentially between the facing side edges of the outer platforms of the blades serves to limit the damage caused to the composite material by repeated contact being made between said edges in operation. This likewise serves to increase the lifetime of the blades.

In an advantageous arrangement that is common to all of these embodiments, the mass of the strip lies in the range 2% to 6%—and corresponds preferably to 5%—of the mass of the blade in which said strip is designed to be mounted.

The invention also provides a turbine engine rotor wheel element comprising: a pair of adjacent composite-material blades, each having an outer platform at its free radial end, the outer platform having a cavity that extends in a direction that is tangential relative to the rotor wheel, the cavities of the outer platforms opening out into adjacent facing edges of the platforms; and a vibration damper as defined above and arranged between the outer platforms of the blades.

The invention also provides a turbine engine rotor wheel having a plurality of elements as defined above. Finally, the invention provides a turbine engine including at least one such rotor wheel.

BRIEF DESCRIPTION OF THE DRAWINGS

Other characteristics and advantages of the present invention appear from the following description with reference to the accompanying drawings that show embodiments having no limiting character. In the figures.

DETAILED DESCRIPTION OF EMBODIMENTS

Figure 1:
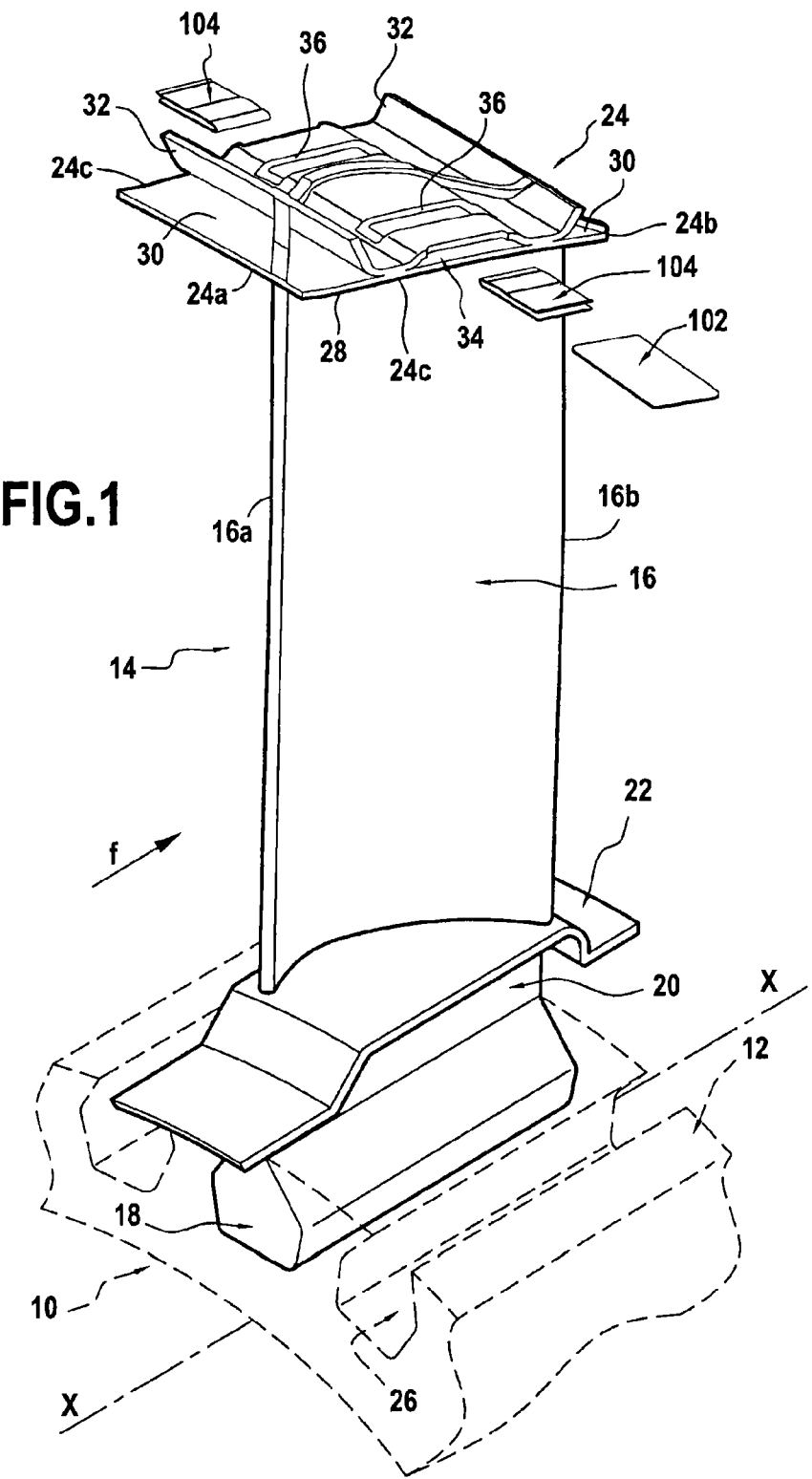
FIG. 1 is a diagram showing how a vibration damper constituting a first embodiment of the invention is mounted in the outer platform of a composite-material blade.
Figure 2:
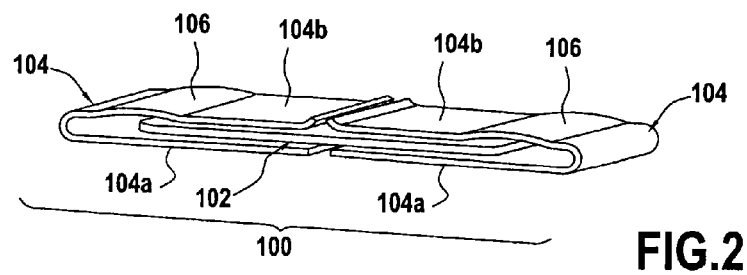
FIG. 2 is an enlarged view in perspective of the FIG. 1 vibration damper.
Figure 3:
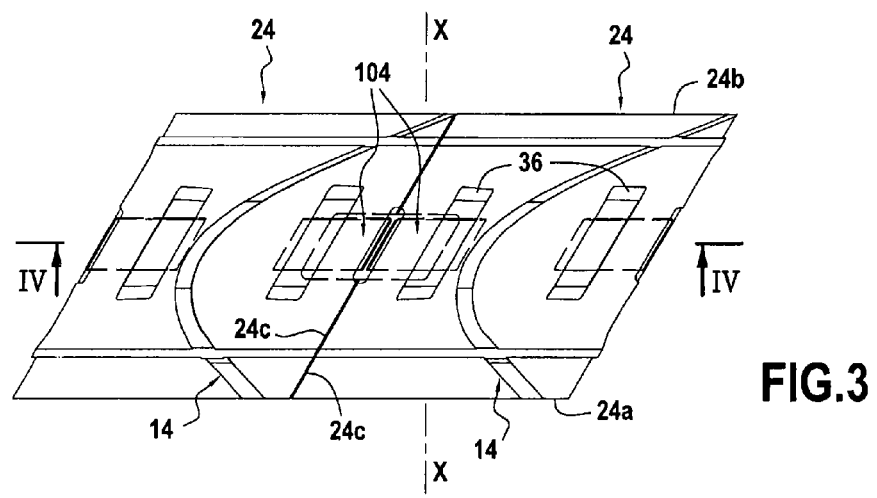
FIG. 3 is a plan view of two adjacent blades with a FIG. 1 vibration damper between the outer platforms of the blades.
Figure 4:
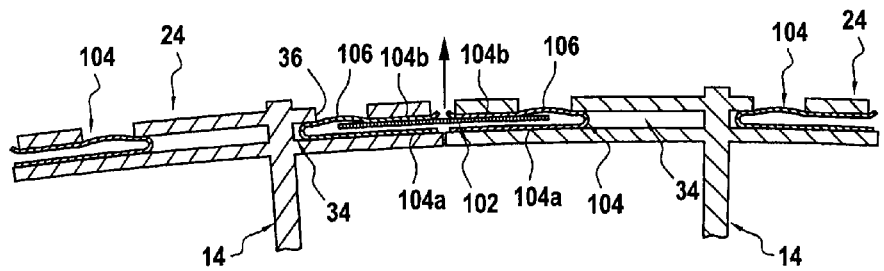
FIG. 4 is a section view on IV-IV of FIG. 3.

The invention is applicable to various types of turbine engine blade, in particular to compressor blades and turbine blades of various gas turbine spools, for example to a rotor wheel blade of a low-pressure turbine stage, such as that shown in FIG. 1.

In well-known manner, the rotor wheel 10 of a low-pressure turbine stage comprises a turbine rotor 12 (shown in part) having an axis of rotation X-X carrying a plurality of blades 14 that are substantially mutually identical (in terms of composition, mass, dimensions, and geometrical shape). For reasons of simplification, only one blade is shown in FIG. 1.

The blade 14 of FIG. 1 comprises an airfoil 16, a root 18, e.g. having a bulb-shaped section, a tang 20 extending the root, an inner platform 22 situated between the tang and the airfoil, and an outer platform 24 situated in the vicinity of the free end of the blade.

The airfoil 16 extends in a longitudinal direction between the inner and outer platforms 22 and 24 and it presents a curved profile in cross-section between its leading edge 16a and its trailing edge 16b. The blade 14 is mounted on the turbine rotor 12 by engaging its root 18 in a housing 26 of complementary shape formed in the periphery of the rotor.

At its radially outer end, the airfoil 16 connects with the outer platform 24 via an inside face 28 of the platform that defines the outside of the flow passage for the gas stream passing through the turbine. In its upstream and downstream end portions (upstream and downstream being relative to the flow direction f of the gas stream), the outer platform is terminated by overhangs 30. On the outside, the outer platform carries wipers 32 of tooth-shaped profile, with the ends of the wipers being suitable for penetrating into a layer of abradable material of a turbine ring (not shown) in order to reduce the clearance between the tip of the blade and the turbine ring.

The outer platform 24 of the blade is of substantially rectangular shape, with an upstream edge 24a and a downstream edge 24b extending perpendicularly to the flow direction of the gas stream and connected together by two side edges 24c via which the outer platform comes into contact with the outer platforms of two blade of the rotor wheel that are directly adjacent thereto.

The blade shown in FIG. 1 is made of composite material, e.g. of CMC, using a fabrication method such as that described by way of example in French patent application No. 09/58931 filed on Dec. 14, 2009 jointly by Snecma and Snecma Propulsion Solide, the content of which is incorporated herein by reference.

The method described in that patent application presents the feature whereby the fiber blank that is made by three-dimensional weaving is shaped in order to obtain a single-piece fiber preform having a first portion forming a preform for the blade airfoil 16 and root 18, a second portion forming a preform for the inner platform 22 or the outer platform 24, and a third portion forming a preform for reinforcing the inner platform or a preform for the overhangs 30 of the outer platform. Thus, once the preform has been densified, a composite-material blade is obtained having fiber reinforcement constituted by the preform and densified by the matrix, thereby forming a single part having the inner and/or outer platform(s) integrated therein.

Naturally, other methods of fabricating a composite-material blade could be used for making the blades.

In operation, the blades 14 of the rotor wheel 10 are subjected to vibration that needs to be damped. For this purpose, provision is made for vibration dampers to be housed between the outer platforms of adjacent blades.

With reference to FIGS. 1 to 4, there follows a description of a first embodiment of a vibration damper of the invention.

Each vibration damper 100 in this first embodiment comprises in particular a strip 102 of substantially plane and rectangular shape and two jackets 104 each in the form of a plate that is folded in half, the strip and the jackets being housed in cavities 34 formed facing each other in the outer platforms 24 of two adjacent blades of the rotor wheel.

The cavity 34 formed in the outer platforms of the blades extend angularly (i.e. in a direction that is substantially circumferential relative to the rotor wheel) so that each of them opens out into one of the side edges 24c of the outer platforms. Furthermore, they preferably extend axially between the two wipers 32 of the outer platforms.

These cavities 34 are preferably made while weaving the fiber blank that is used for fabricating the blades out of composite material, e.g. by inserting an insert between the two layers of the fiber preform forming the preform for the outer platform and the preform for its overhangs (in order to avoid modifying the flow passage for the gas stream, the outer layer is deformed while the inner layer is left unchanged). After the fiber preform has been densified, the inserts are removed.

By way of example, the jackets 104 may be flexible metal plates that are substantially rectangular and folded in half along a fold line that is to be received towards the inside end of the cavity 34 in the outer platform that receives one of them. Each strip 102 is then inserted between the two folded halves of a jacket (an inner half 104a and an outer half 104b) and extends transversely between the outer platforms of two adjacent blades.

In operation, and under the effect of the centrifugal force that results from the rotor wheel rotating, the strips 102 are pressed radially against the outer halves 104b of the jackets 104 (FIG. 4) and rub against these halves in order to dissipate the vibratory energy that results from this rotation of the wheel.

Each damper strip 102 possesses a mass that lies in the range 2% to 6%—and that is preferably equal to 5%—of the mass M of the blade 14 in which the jacket 104 is mounted (i.e. the mass M is equal to the mass of the blade plus the mass of a damper jacket 104). Such a mass enables the strips to perform their vibration damper function properly.

In an advantageous arrangement, means are also provided for holding the jackets 104 in the cavities 34 of the outer platforms of the blades.

For this purpose, openings 36 are formed in the outer walls of the cavities 34 of the outer platforms in order to receive projections 106 formed in the outer halves 104b of the jackets 104. As shown in FIG. 1, the jackets 104 need to be pinched in order to be inserted into the cavities in the outer platforms. Once inserted, the pinching force is released and the projections 106 on the jackets then project radially through the openings 36 (FIG. 4), thereby preventing any accidental disengagement of the jackets from their cavities.

It should be observed that the jackets 104 thus serve to prevent the strips 102 from acting directly to wear away the outer platforms of the CMC blades between which they are mounted.

It should also be observed that the strips 102 may present axially directed projections as described below for the second embodiment.

Figure 5:
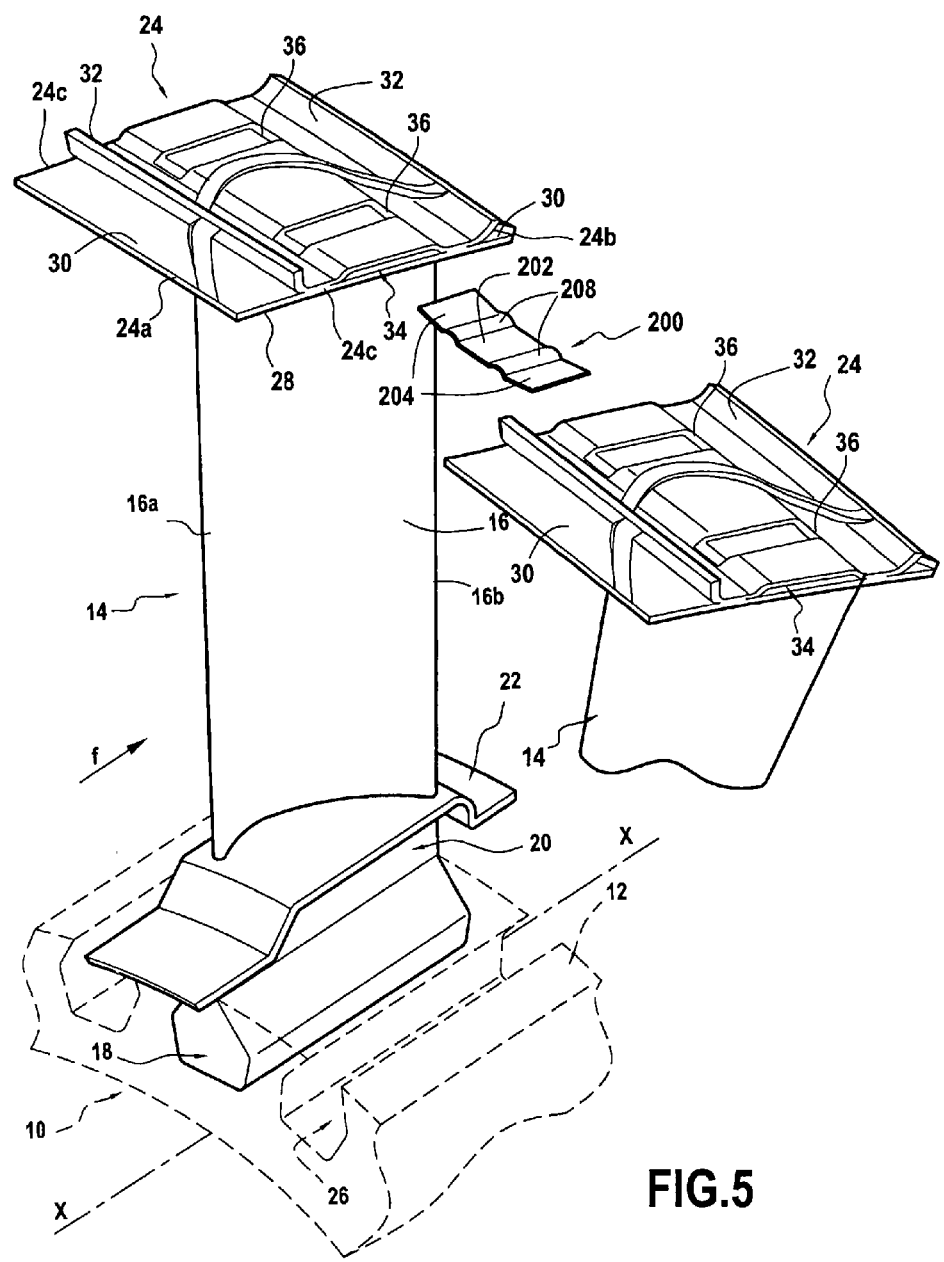
FIG. 5 is a diagram showing how a vibration damper in a second embodiment of the invention is mounted.
Figure 6A:
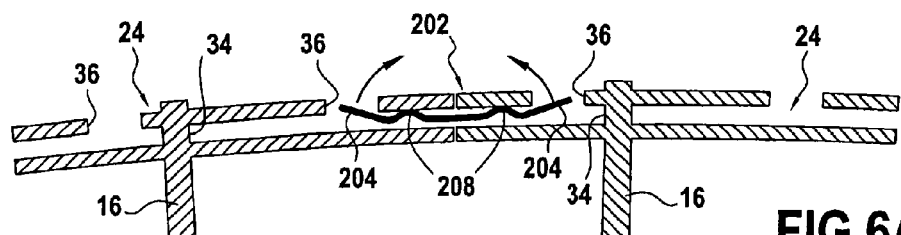
FIGS. 6A and 6B are radial section views showing how the ends of the FIG. 5 vibration damper strip are folded to form hooks.
Figure 6B:
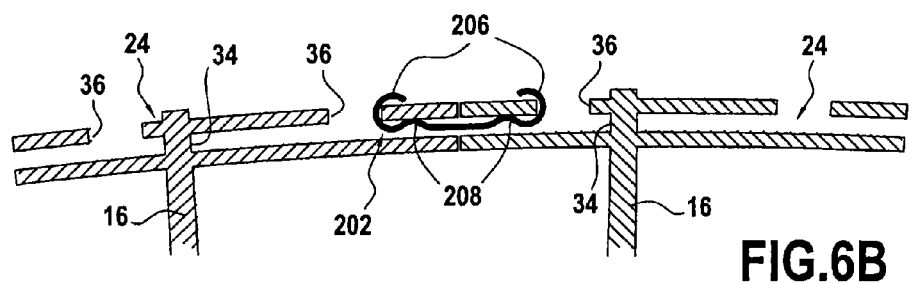
Figure 7:
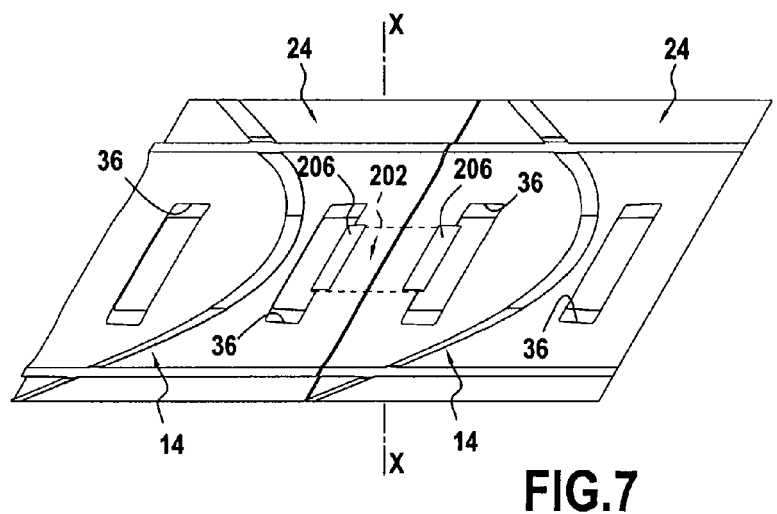
FIG. 7 is a plan view of two adjacent blades with the FIG. 5 vibration damper between the outer platforms of the blades.

With reference to FIGS. 5 to 7, there follows a description of a second embodiment of a vibration damper of the invention.

The vibration damper 200 in this second embodiment also has a strip 202 of substantially plane and rectangular shape that is inserted lengthwise in cavities 34 formed in the outer platforms of the blades, each of these cavities presenting an opening 36 in its outer wall.

Once the strip 202 has been inserted in the cavities in the outer platforms, its free ends 204 are taken through openings 36 by means of a suitable tool and they are folded radially outwardly so as to form hooks 206 that project through these openings (FIGS. 6A and 6B).

In operation, and under the effect of the centrifugal force that results from rotation of the rotor wheel rotating, the strips 202 press radially against the outer walls of the cavities in the outer platforms of the blades and they rub against these walls in order to dissipate the vibratory energy that results from the rotation of the wheel.

The presence of hooks 206 engaged in the openings 36 in the outer platforms of the blades makes it possible, in the event of the blades tilting relative to one another, to limit any displacement (in the radial direction and in the tangential direction) between the outer platforms of the blades.

As shown in FIGS. 6A and 6B, each strip 202 may also present outwardly directed projections 208 (outwardly directed when the strips are mounted in the outer platforms of the blades), which projections are designed to make point contact against the outer walls of the cavities 34 in the outer platforms of the blades. Vibratory energy is then dissipated by these projections rubbing against the outer walls of the cavities. The presence of such projections makes it possible to guarantee contact of the strip against the outer walls of the cavities 34, even in the event of the outer platforms of the blades being mutually displaced.

Each strip 202 possesses mass that lies in the range 2% to 6%—and is preferably equal to 5%—of the mass of a blade 14. Such a mass enables the blades to perform their vibration damper function properly.

Figure 8:
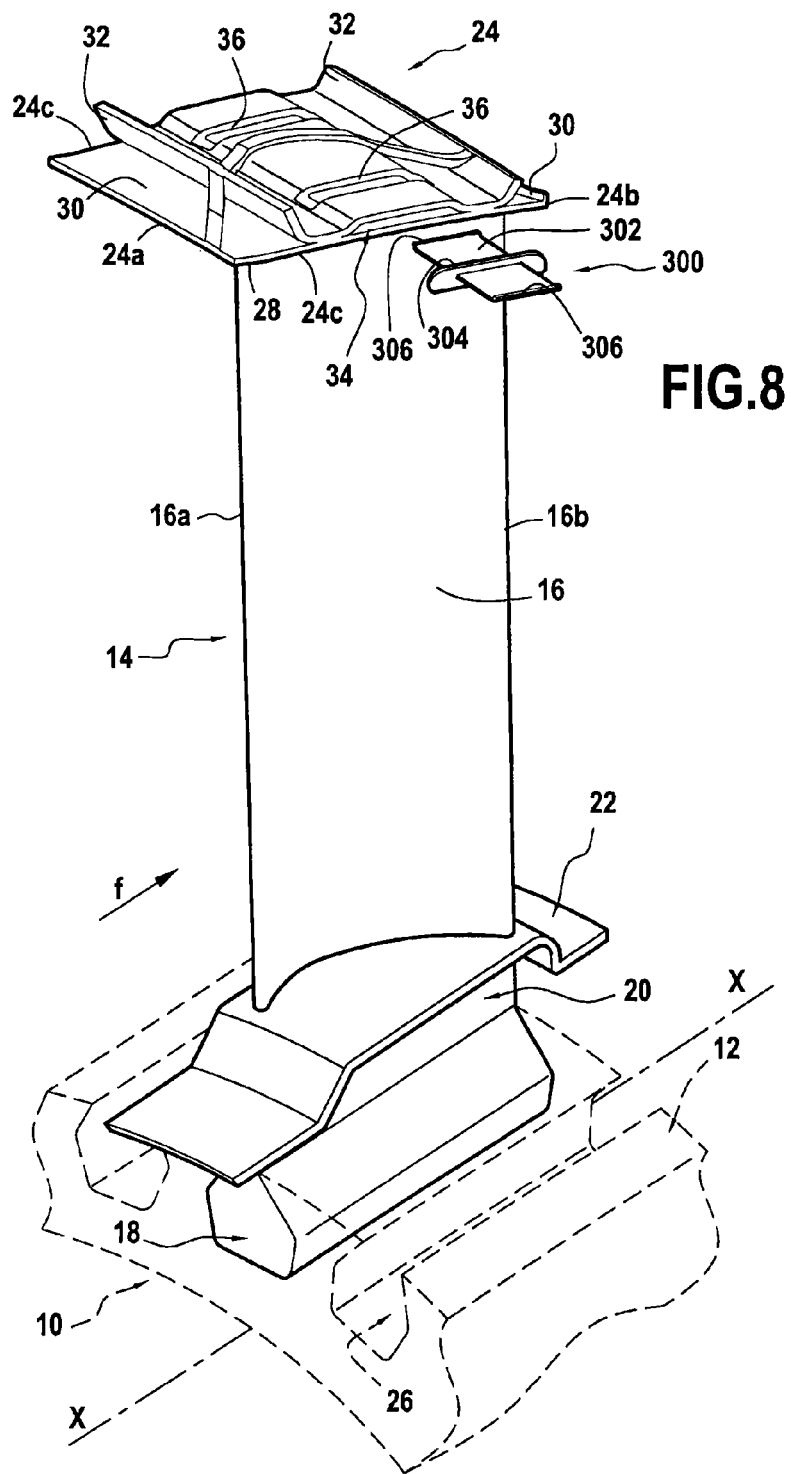
FIG. 8 is a diagram showing how a vibration damper in a third embodiment of the invention is mounted.
Figure 9:
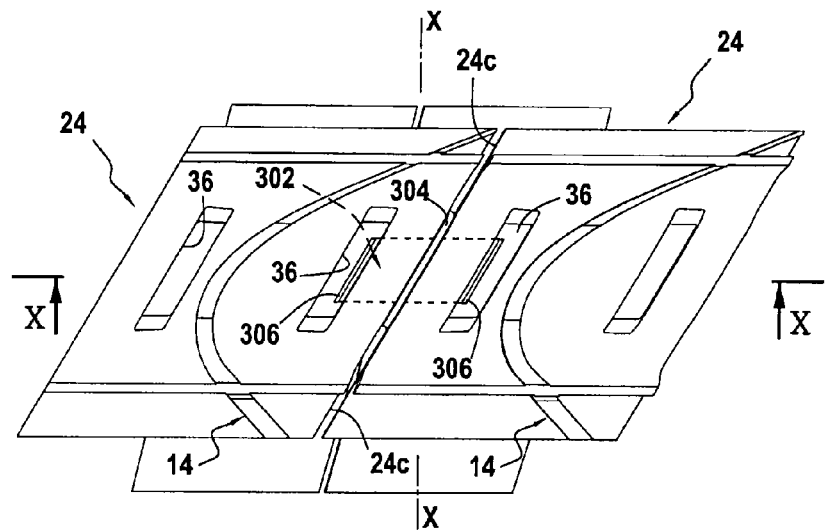
FIG. 9 is a plan view of two adjacent blades with the FIG. 8 vibration damper between the outer platforms of the blades.
Figure 10:
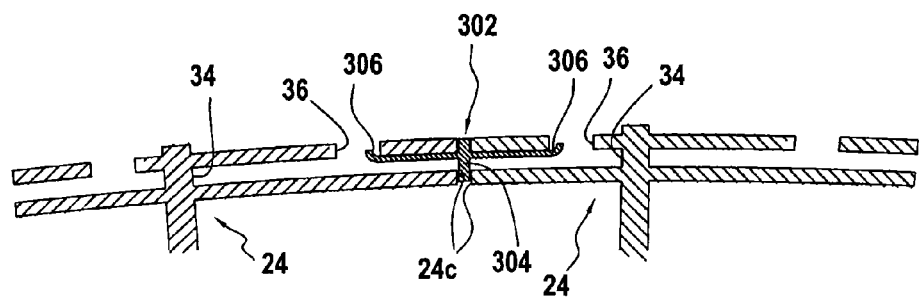
FIG. 10 is a section view on X-X of FIG. 9.

With reference to FIGS. 8 to 10, there follows a description of a third embodiment of a vibration damper of the invention.

The vibration damper 300 in this third embodiment likewise comprises a strip 302 of substantially plane and rectangular shape that is inserted lengthwise in cavities 34 formed in the outer platforms of the blades.

Furthermore, each strip 302 is provided with a plate 304 that extends transversely relative to the length of the strip and that is located approximately halfway from its two free ends 306. When the strip is inserted between the outer platforms of the blades in the cavities 34, the plate 304 comes tangentially into contact against the adjacent edges 24c of the outer platforms 24 of the blades (FIGS. 9 and 10).

The length of the plate 304 is not less than the width of the strip 302 and it may project beyond its side edges, as shown in the figures. When it is in contact with the adjacent edges of the outer platforms of the blades, this plate thus serves to limit impacts between these edges in operation, thereby avoiding weakening the composite material from which the blades are made.

In operation, and under the effect of the centrifugal force that results from the rotor wheel rotating, the strips 302 are pressed radially against the outside walls of the cavities in the outer platforms of the blades and they rib against these walls in order to dissipate the vibratory energy that results from the wheel rotating.

It should be observed that the side edges of the outer platforms of the blades against which the plates of the strip come into contact form dampers that can be machined in order to form tangential indentations for receiving these plates.

It should also be observed that the free ends 306 of the strips 302 may be folded outwards so as to form hooks that engage with openings 36 formed in the outer walls of the cavities 34 of the outer platforms of the blades (as in the second embodiment).

It should also be observed that the strips 302 may present outwardly directed projections as described for the second embodiment.

Finally, it should be observed that jackets could be inserted in the cavities of the outer platforms of the blades that receive the strips 302, the free ends 306 of the strips then being inserted in said jackets (as in the first embodiment).

The invention claimed is:

1. A vibration damper between outer platforms of adjacent composite-material blades of a rotor wheel of a turbine engine, the damper comprising:
    a strip for inserting lengthwise in tangential cavities that are formed facing each other in the outer platforms of two adjacent composite-material blades of a turbine engine rotor wheel,
    wherein the strip includes a plate extending transversely relative to the strip and configured to come into contact with adjacent side edges of the blades when the strip is inserted in the cavities in the outer platforms.

2. The damper according to claim 1, wherein mass of the strip lies in a range of 2% to 6% of mass of a blade in which the strip is to be mounted.

3. The damper according to claim 1, wherein mass of the strip corresponds to 5% of mass of a blade in which the strip is to be mounted.

4. A turbine engine rotor wheel element comprising:
    a pair of adjacent composite-material blades, each including an outer platform at its free radial end, the outer platform including a cavity that extends in a direction that is tangential relative to the rotor wheel, the cavities of the outer platforms opening out into adjacent facing edges of the platforms; and
    a vibration damper according to claim 1 and arranged between the outer platforms of the blades.

5. The turbine engine rotor wheel element according to claim 4, wherein the blades are made of ceramic matrix composite material and the strip of the vibration damper is made of metal.

6. The turbine engine rotor wheel element according to claim 4, wherein the cavities in the outer platforms of the blades extend axially between two sealing wipers of the outer platforms.

7. A turbine engine rotor wheel comprising the turbine engine rotor wheel element according to claim 4.

8. A turbine engine comprising at least one rotor wheel according to claim 7.

* * * * *